(12) United States Patent
Hopcroft et al.

(10) Patent No.: US 6,359,629 B1
(45) Date of Patent: Mar. 19, 2002

(54) BACKFACE PRIMITIVES CULLING

(75) Inventors: Michael J. Hopcroft, Kirkland, WA (US); Antonia Spyridi, Sunnyvale, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/111,284

(22) Filed: Jul. 6, 1998

(51) Int. Cl.$^7$ ............................................. G06T 15/30
(52) U.S. Cl. ..................... 345/620; 345/423; 345/427; 345/619; 345/623
(58) Field of Search ................................ 345/421, 422, 345/435, 423, 439, 433, 434, 344, 420, 419, 427, 429, 953, 623, 620, 581

(56) References Cited

U.S. PATENT DOCUMENTS

| | | | | |
|---|---|---|---|---|
| 5,357,600 A | * | 10/1994 | Shirman et al. ............. | 345/433 |
| 5,583,974 A | | 12/1996 | Winner et al. ............... | 395/122 |
| 5,734,806 A | | 3/1998 | Narayanaswami .......... | 395/122 |
| 5,751,291 A | | 5/1998 | Olsen et al. ................. | 345/422 |
| 5,757,321 A | * | 5/1998 | Billyard ....................... | 345/434 |
| 5,764,228 A | * | 6/1998 | Baldwin ...................... | 345/344 |
| 5,825,363 A | | 10/1998 | Anderson ................... | 345/422 |
| 5,920,687 A | | 7/1999 | Winner et al. ............... | 395/122 |
| 5,977,979 A | | 11/1999 | Clough et al. ............... | 345/422 |
| 5,982,376 A | | 11/1999 | Abe et al. .................... | 345/422 |

OTHER PUBLICATIONS

Zhang et al. "Fast Backface Culling Using Normal Masks." ACM Symposium on 3D Graphics, Providence, 1997.
Kumar et al. "Interactive Display of Large Scale Trimmed NURBS Models." Proceedings of the 1995 ACM Symposium on Interactive 3D Graphics, Monterey, CA, 1995.

* cited by examiner

*Primary Examiner*—Mark Zimmerman
*Assistant Examiner*—Kimbinh T. Nguyen
(74) *Attorney, Agent, or Firm*—Wagner Murabito & Hao LLP

(57) ABSTRACT

A method of efficiently removing backfacing primitives from the graphics pipeline such that rendering efficiency is increased. In one embodiment of the present invention, a bounding cone of normal vectors of a primitive is first determined during pre-processing. During the rendering process, before the primitive is drawn, the bounding cone is compared with a half-space defined by a viewing vector. Primitives whose bounding cones do not intersect with the half-space will be removed from further processing. In this way, rendering efficiency is increased. In another embodiment, a normal bit-vector is used to represent normal directions of a primitive, and a visibility bit-vector is used to represent visible normal directions. In that embodiment, primitives are culled efficiently by comparing the normal bit-vector with the visibility bit-vector.

48 Claims, 12 Drawing Sheets

V = 11110001

BACKFACE PRIMITIVES CULLING

FIELD OF THE INVENTION

The present invention relates to the field of computer generated graphics. More specifically, the present invention relates to methods of increasing efficiency of rendering two-dimensional images of three-dimensional objects in computers.

BACKGROUND OF THE INVENTION

Computer graphics is used in a wide variety of applications, such as in business, science, animation, simulation, computer-aided design, process control, electronic publishing, gaming, medical diagnosis, etc. In an effort to portray a more realistic real-world representation, three dimensional objects are transformed into models having the illusion of depth for display onto a two-dimensional computer screen. This is accomplished by using a number of polygons to represent a three-dimensional object. Next, a scan conversion process is used to determine which pixels of a computer display fall within each of the specified polygons. Thereupon, texture is selectively applied to those pixels residing within specified polygons. Finally, lighting, shading, shadowing, translucency, and blending effects are applied.

For a high resolution display (1280×1024) having over a million pixels, for which values must be generated for each and every pixel, displaying a three-dimensional scene on a computer system is a rather complicated task. Processes like lighting, shading, shadowing, texture mapping, blending, etc., are particularly computation intensive, requiring a tremendous amount of processing power. Indeed, even more processing power is necessary for displaying interactive computer graphics, where 3-D images change in response to a user input (e.g. flight simulation). Naturally, the more complex the scene, the more processing power will be required to render that scene.

Although throughput of computer graphics systems has increased considerably in recent years, the size and complexity of three-dimension scenes have been growing even faster. Scenes composed of millions of polygons are no longer uncommon. In light of the enormous processing power necessary to generate highly-complex scenes and the limitations in the speed of currently available hardware, there have been efforts to develop more efficient methods to simplify the task of rendering images of three-dimensional objects. One such method is known as visibility culling or occlusion culling. Simply put, visibility culling limits the number of polygons rendered in each frame by removing hidden or obscured surfaces from the graphics pipeline. When these hidden surfaces are culled away, highly complex scenes can be rendered at a very high rate.

One well known method for reducing computational workload without sacrificing rendering accuracy is known as backface culling. The backface culling method is validated by the fact that polygons facing away from the viewer must be invisible and thus can be omitted from further graphics processing. Typically, the backface test involves calculating the dot product between the polygon's normal and the view vector formed from any point on the polygon to the viewing point. If the result is positive then the polygon is facing towards the viewer. If the result is negative then the polygon is facing away from the viewer and may be removed from the graphics pipeline.

Although conventional backface culling methods are efficient in reducing the number of polygons that are sent down to the graphics pipeline, performance gain is somewhat limited as a tremendous amount of computational power is required to determined which polygons are backfacing and which polygons are visible. To this end, numerous methods have been proposed to reduce the computational overhead of conventional backface culling methods. One such method is proposed by Zhang et al. in "Fast Backface Culling Using Normal Masks", ACM Symposium, 1997. The method described by Zhang et al. makes use of a bitmask to represent a normal direction per polygon, and then compares the bitmask to a backface mask. The polygon is culled if the bitmask is covered by the backface mask.

The method described in Zhang et al., however, does not address the problem that each polygon is individually tested and processed. While that method is useful in high-end graphics computer systems, it is not as useful in lower-end models where computational bandwidth is limited. Thus, what is needed is a method and apparatus for accelerating interactive rendering of complex scenes. What is further needed is a method and apparatus for performing visibility culling that is capable of efficiently removing backfacing polygons with minimal computational effort.

SUMMARY OF THE PRESENT DISCLOSURE

The present invention is a method and apparatus for performing visibility culling that is capable of efficiently removing backfacing polygons with minimal computational effort. More specifically, in one embodiment of the present invention, a bounding cone of all the normal vectors of each primitive in the model is calculated during a pre-processing phase. A center vector and an apex angle of the bounding cone is then stored in association with the primitive. Thereafter, during rendering, the bounding cone associated with the primitive is then tested against a visible half-space defined by a viewing vector. If the bounding cone intersects the visible half-space, the primitive is considered visible, and is sent down the graphics pipeline. However, if the bounding cone does not intersect the visible half-space, the primitive is considered backfacing, and is culled. That is, the primitive is not sent down the graphics pipeline.

According to another embodiment of the present invention, during a pre-processing phase, for each primitive, P, having a plurality of normal vectors, the normal vectors are classified with respect to a tessellation, T, of a unit sphere. In particular, a normal bit-vector, N, comprising n-bits and wherein each bit corresponds to one facet of the tessellation, T, is used to represent the directions of the normal vectors. Particularly, in this embodiment, a bit of the normal bit-vector, N, is set to 1 if the facet corresponding to that bit intersects one of the normal vectors of P; and the bit is set to 0 if the corresponding facet does not intersect one of the normal vectors of P. Thereafter, during the rendering stage, a visibility bit-vector is computed. The visibility bit-vector also comprises n-bits wherein each bit corresponds to one facet of the tessellation T. A bit of the visibility bit-vector is set to 1 if a corresponding facet lies within the visible half-space of the viewing vector; and the bit is set to 0 if the corresponding facet does not lie within the visible half-space of the viewing vector. Then, before sending a primitive to the graphics pipeline, the normal bit-vector of the primitive calculated in the preprocessing phase is bitwise added with the visibility bit-vector. In this embodiment, primitives are culled according to the results of the comparison.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be obvious, however, to one skilled in the art, upon reading this disclosure, that the present invention may be practiced without these specific details. In other instances, well-known structures and devices are not described in detail in order to avoid obscuring aspects of the present invention.

Unless specifically stated otherwise as apparent from the following discussions, it is appreciated that throughout the present invention, discussions utilizing terms such as "receiving", "determining", "transmitting", "inserting", "sorting" or the like, refer to the actions and processes of a computer system, or similar electronic computing device. The computer system or similar electronic device manipulates and transforms data represented as physical (electronic) quantities within the computer system's registers and memories into other data similarly represented as physical quantities within the computer system memories into other data similarly represented as physical quantities within the computer system memories or registers or other such information storage, transmission, or display devices.

I. Computer System Environment of the Present Invention

Figure 1:
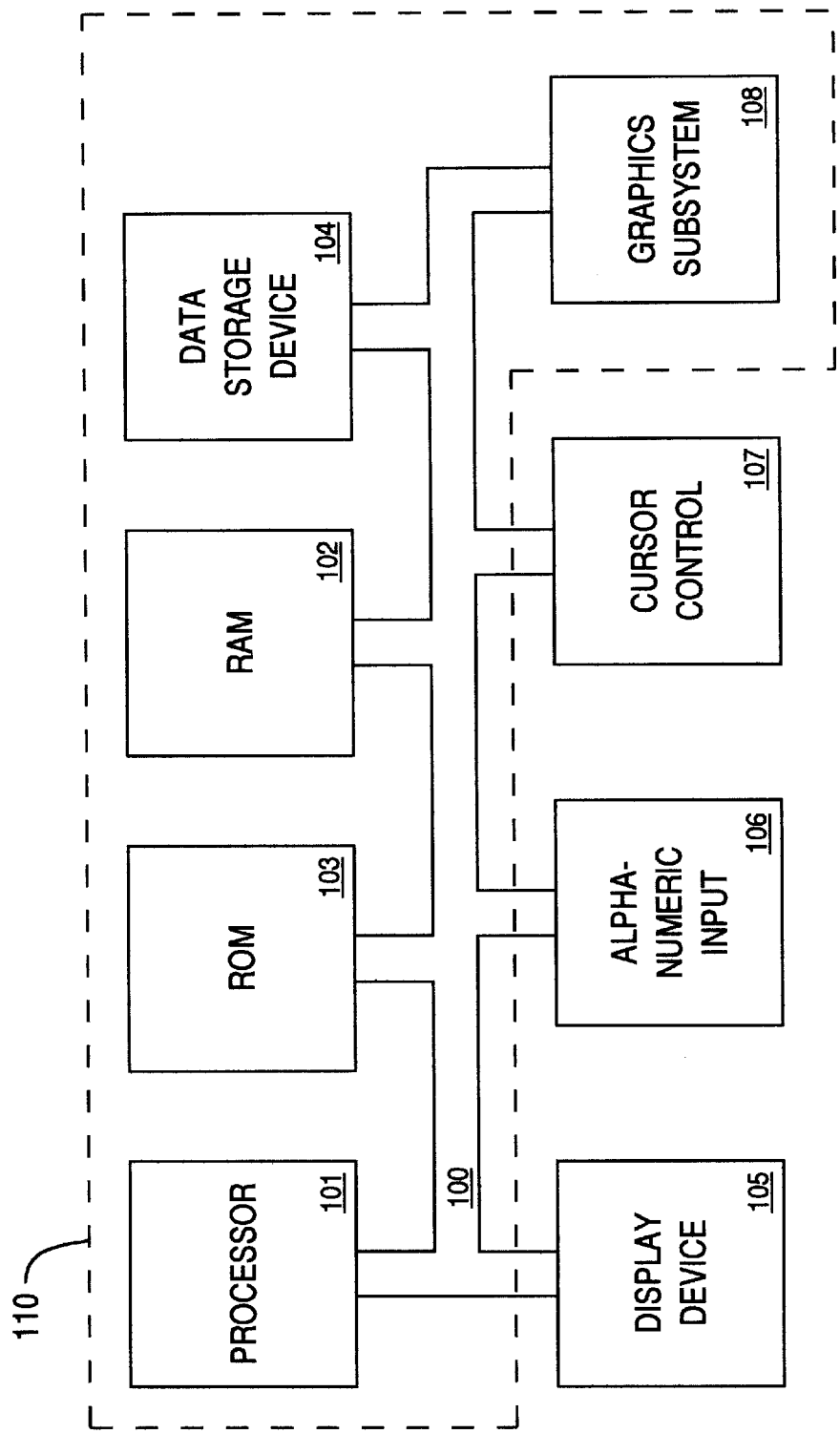
FIG. 1 illustrates an exemplary computer system used as part of a computer graphics system in accordance with one embodiment of the present invention.

With reference to FIG. 1, portions of the present invention are comprised of computer-readable and computer executable instructions which reside, for example, in computer-usable media of a computer system. FIG. 1 illustrates an exemplary computer system 110 used as a part of a computer graphics system in accordance with one embodiment of the present invention. It is appreciated that system 110 of FIG. 1 is exemplary only and that the present invention can operate within a number of different computer systems including general purpose computer systems, embedded computer systems, and stand alone computer systems specially adapted for generating 3-D graphics.

System 110 of FIG. 1 includes an address/data bus 100 for communicating information, and a central processor unit 101 coupled to bus 100 for processing information and instructions. System 110 also includes data storage features such as computer usable volatile memory 102, e.g. random access memory (RAM), coupled to bus 100 for storing information and instructions for central processor unit 101, computer usable non-volatile memory 103, e.g. read only memory (ROM), coupled to bus 100 for storing static information and instructions for the central processor unit 101, and a data storage device 104 (e.g., a magnetic or optical disk and disk drive) coupled to bus 100 for storing information and instructions. A graphics subsystem 108 coupled to bus 100 is also included in system 110 of FIG. 1. System 110 of the present high-speed transparent scene rendering system also includes an optional alphanumeric input device 106 including alphanumeric and function keys is coupled to bus 100 for communicating information and command selections to central processor unit 101. System 110 also optionally includes a cursor control device 107 coupled to bus 100 for communicating user input information and command selections to central processor unit 101. System 110 of the present embodiment also includes an optional display device 105 coupled to bus 100 for displaying information.

Display device 105 of FIG. 1, utilized with the present invention, may be a liquid crystal device, cathode ray tube, or other display device suitable for displaying 3-D graphic images and alphanumeric characters recognizable to a user. Optional cursor control device 107 allows the computer user to dynamically signal the two dimensional movement of a visible symbol (cursor) on a display screen of display device 105. Many implementations of cursor control device 105 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 107 using special keys and key sequence commands. The present invention is also well suited to directing a cursor by other means such as, for example, voice commands. A more detailed discussion of the present complex transparent scene rendering system is found below.

II. General Description of the Present Embodiments

Figure 2A:
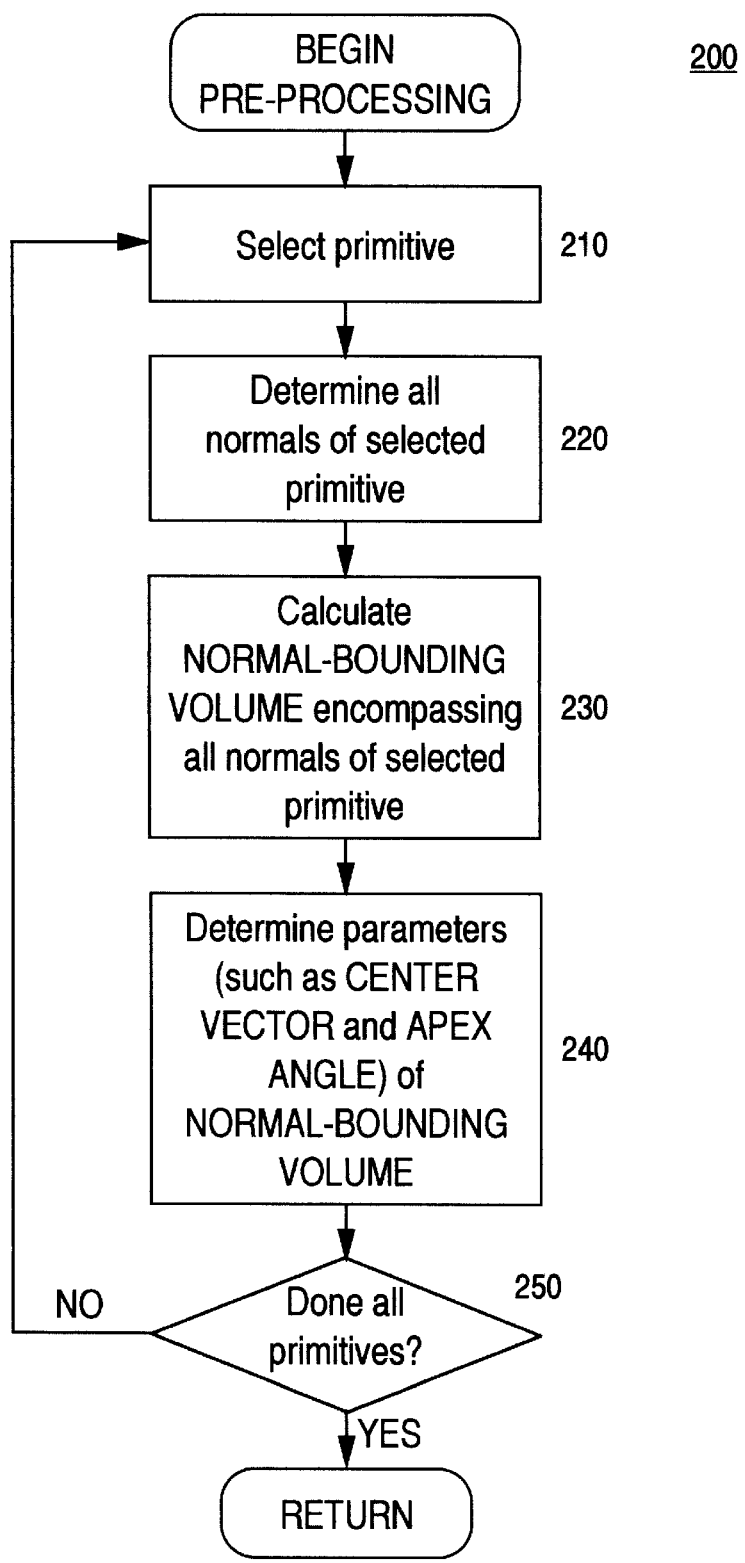
FIG. 2A is a flow chart illustrating the pre-processing stage of one embodiment of the present method of culling backfacing primitives.
Figure 2B:
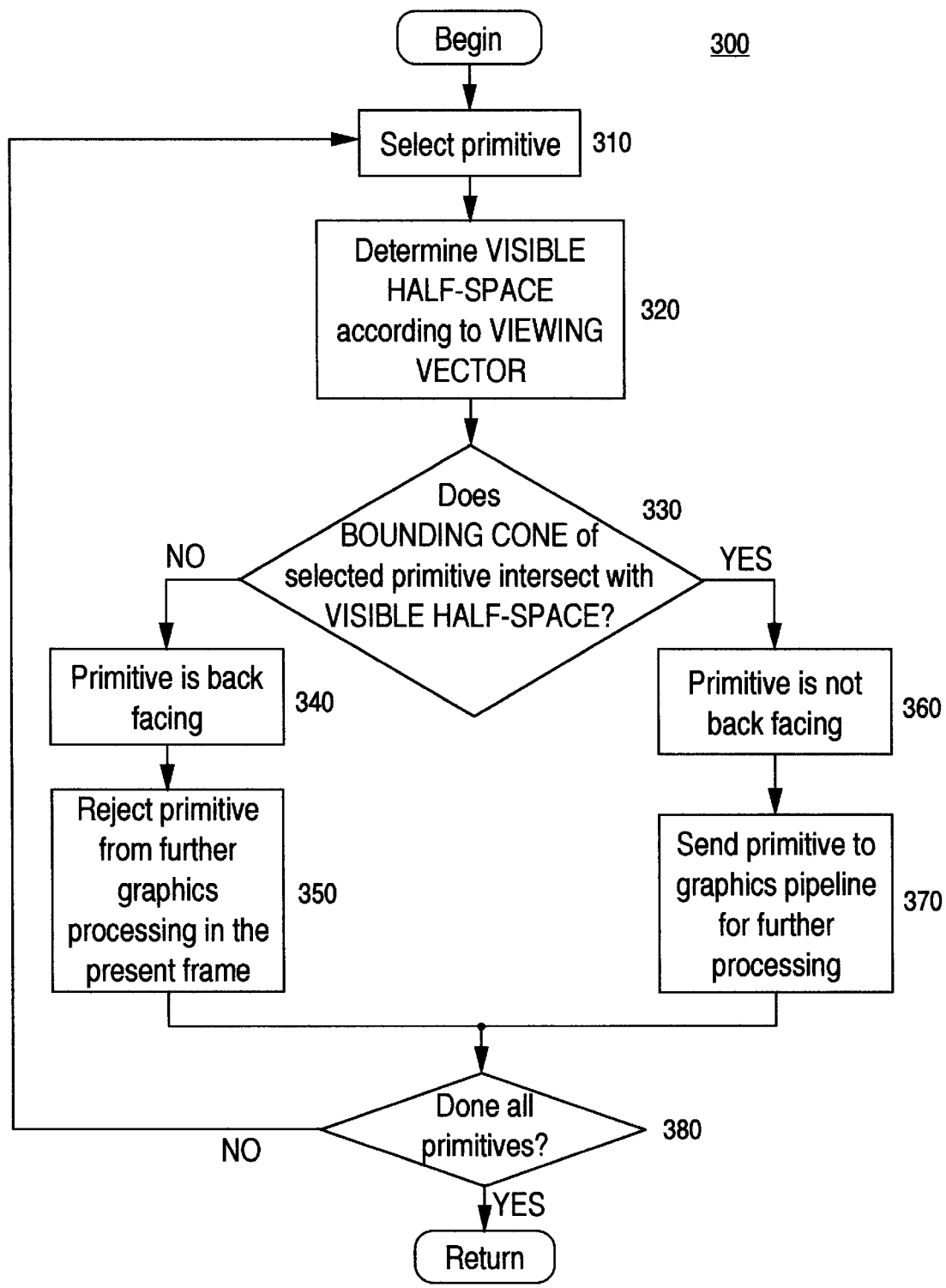
FIG. 2B is a flow chart illustrating the rendering stage of one embodiment of the present method of culling backfacing primitives.
Figure 3A:
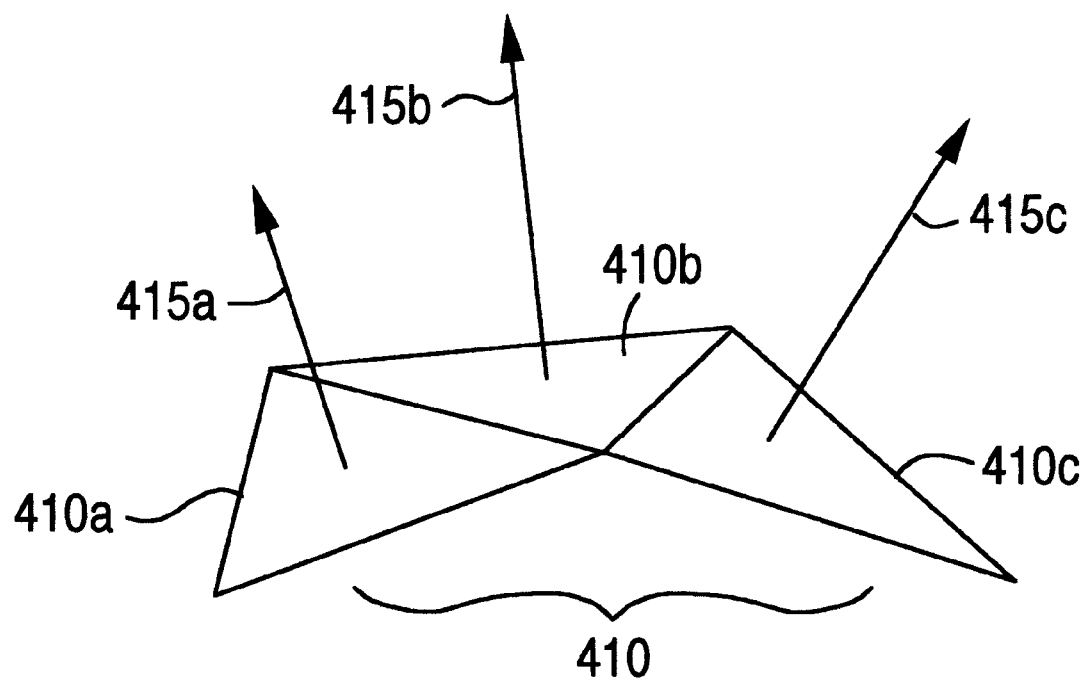
FIG. 3A illustrates an exemplary primitive on which one embodiment of the present invention may be applied. As illustrated, the exemplary primitive comprises a tri-strip.
Figure 3B:
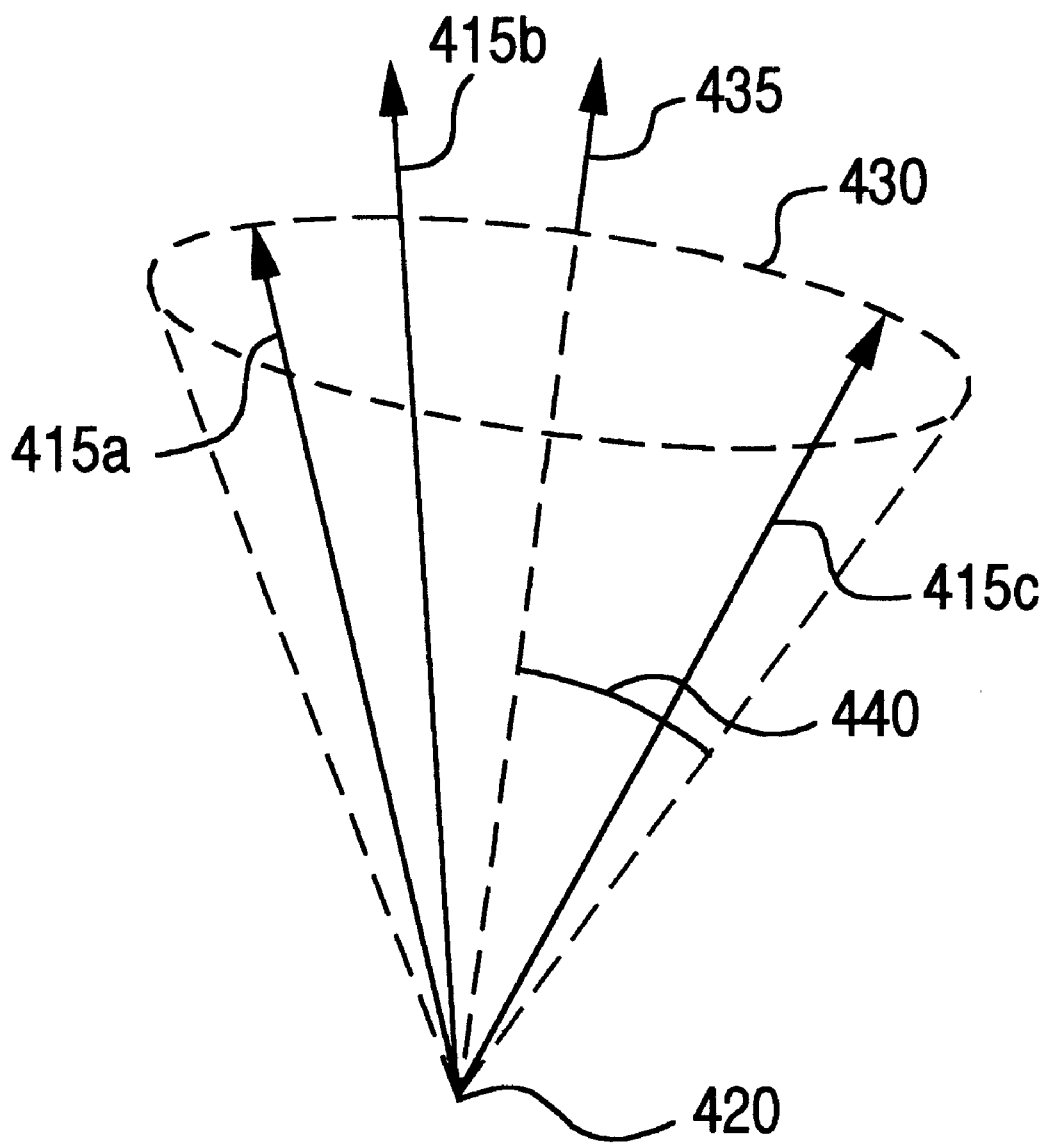
FIG. 3B illustrates an exemplary normal-bounding cone of the exemplary primitive illustrated in FIG. 3A according to one embodiment of the present invention.
Figure 3C:
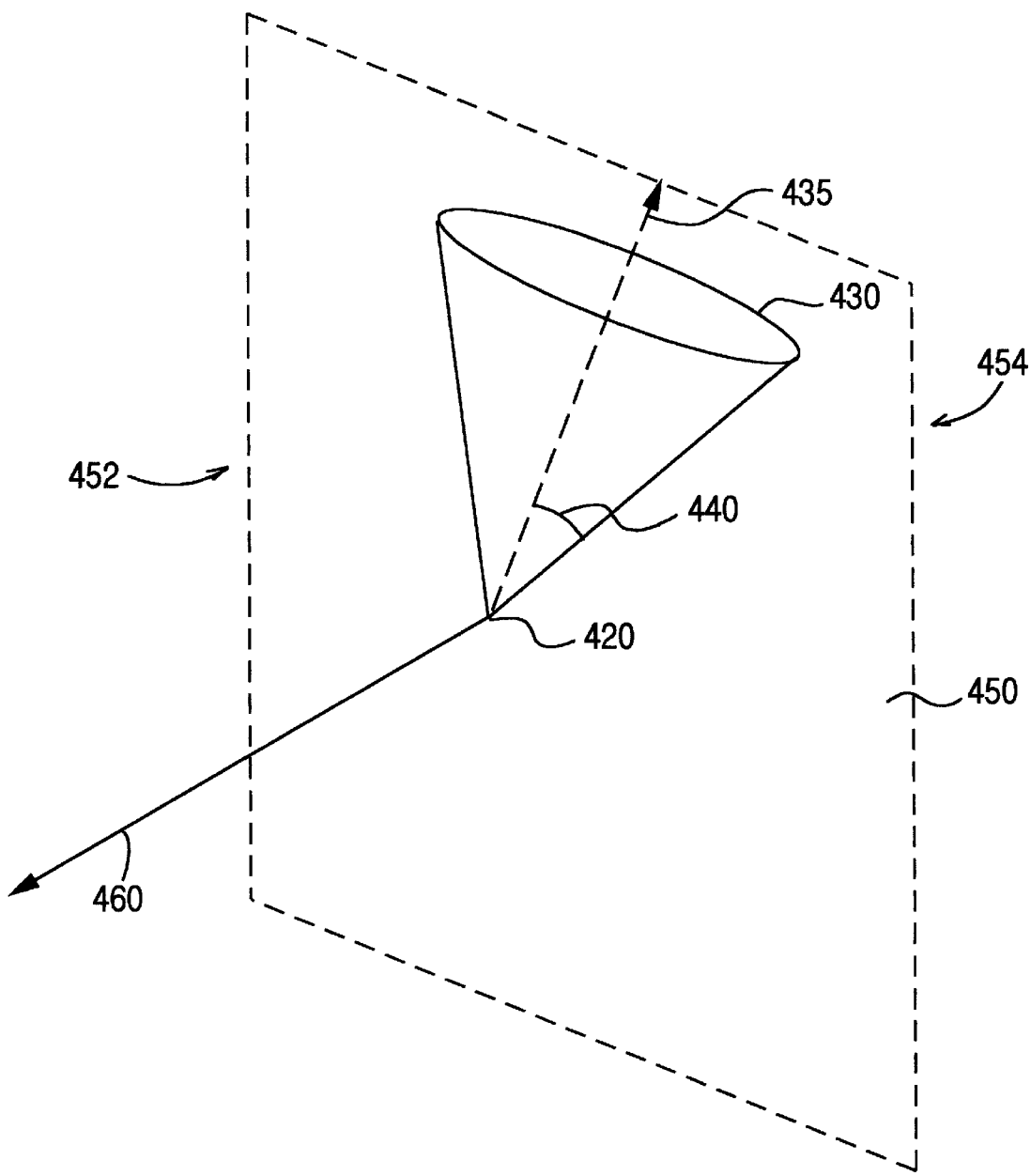
FIG. 3C is a graphical representation illustrating the process of determining whether the exemplary bounding cone of FIG. 3B intersects with a half-space defined by a viewing vector according to one embodiment of the present invention.
Figure 4A:
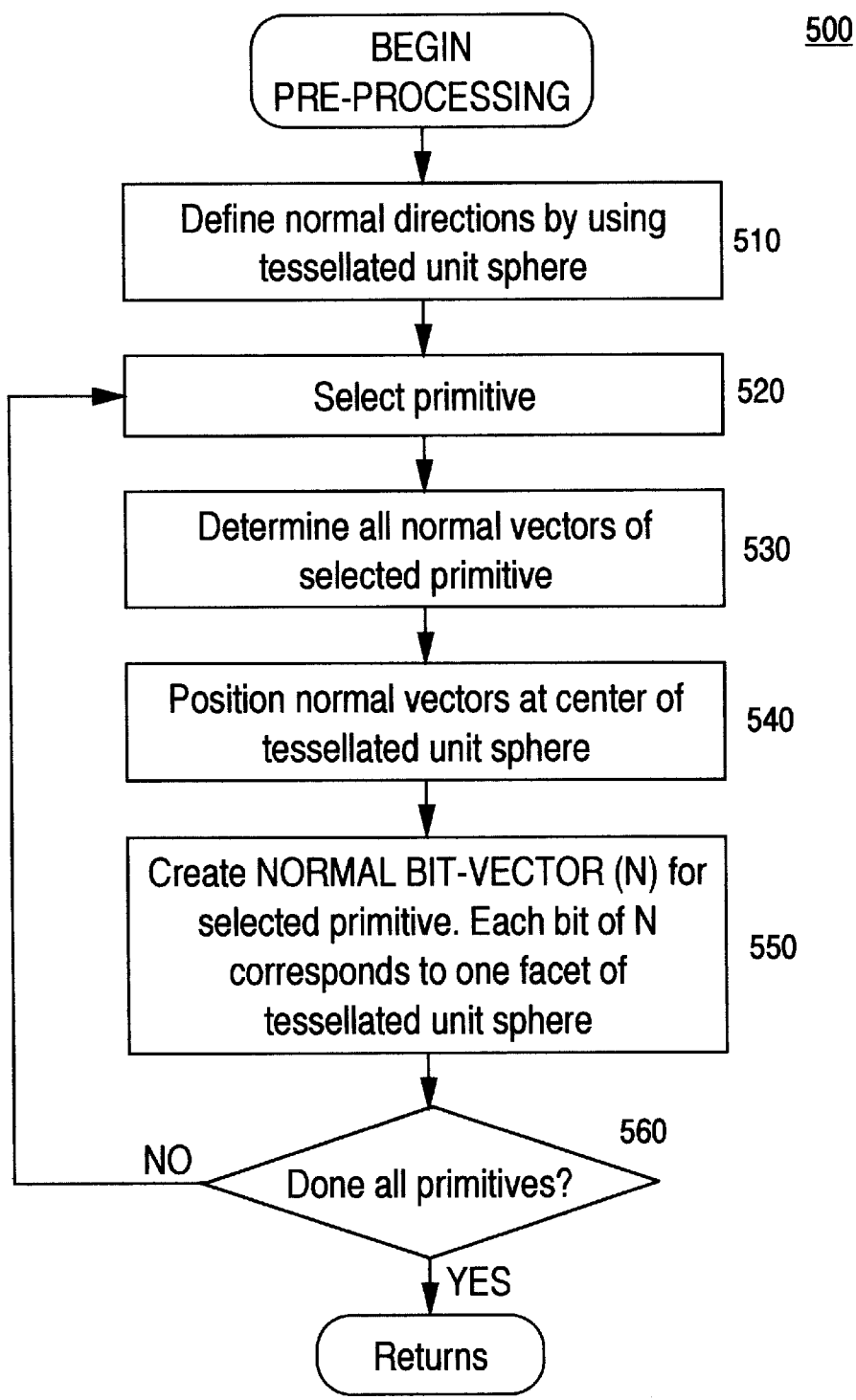
FIG. 4A is a flow chart illustrating the pre-processing stage of another embodiment of the present method of culling backfacing primitives.
Figure 4B:
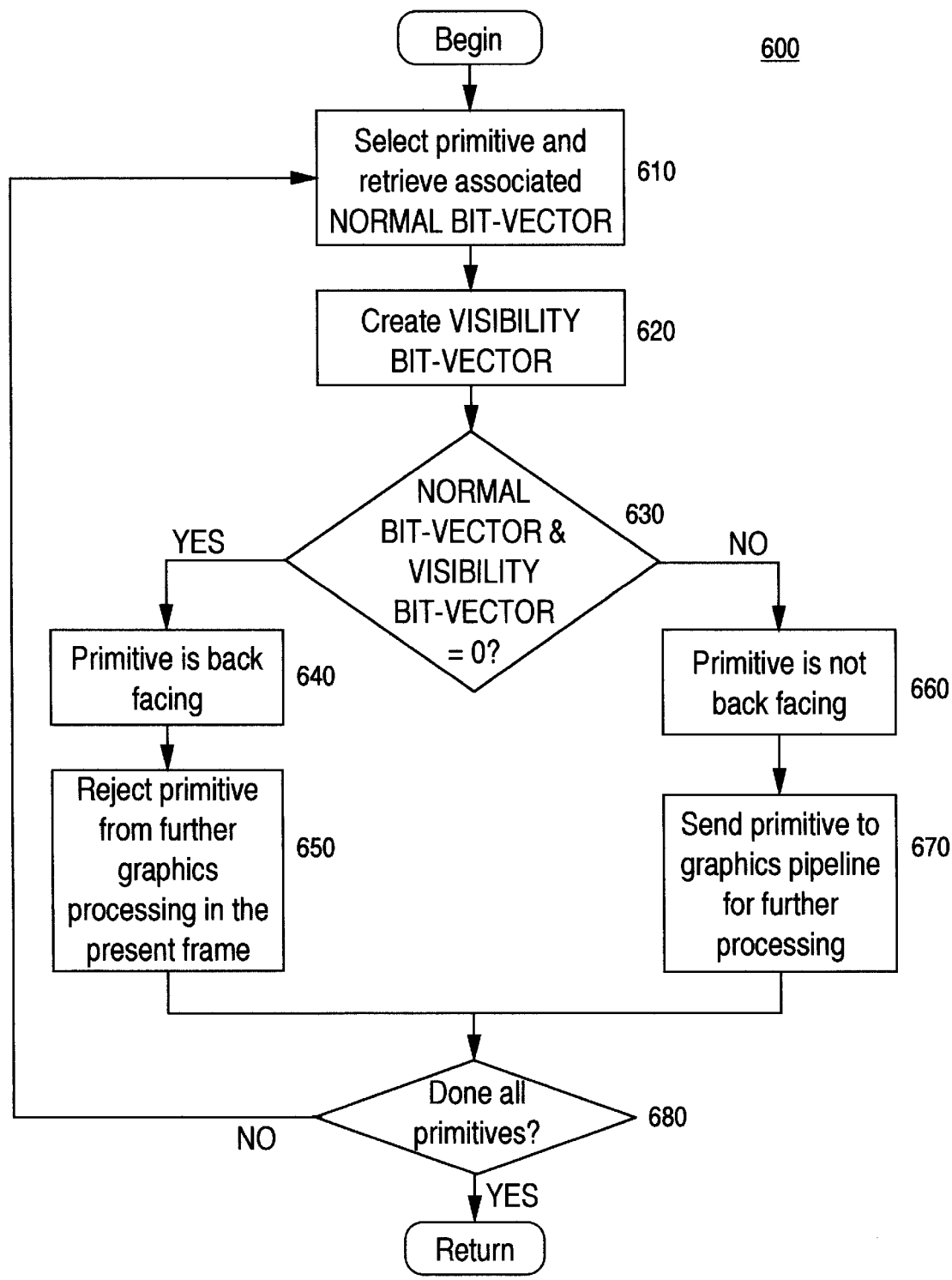
FIG. 4B is a flow chart illustrating the rendering stage of another embodiment of the present method of culling backfacing primitives.

In conventional backface culling methods, each polygon of a 3-D model is processed individually to determine whether that polygon is backfacing or is visible. Naturally, in highly-complex 3-D models having millions of polygons, such a process is nearly as computational intensive as rendering. Therefore, conventional backface culling methods do not notably increase rendering efficiency. In the present invention, however, backface culling is performed at a primitive level. In other words, backface testing is performed for each of the primitives. If it is determined that a primitive is back-facing, the whole primitive is culled. This approach is validated by the observation that primitives typically contain many polygons, and polygons within the same primitive face the same general direction in most 3-D models. The present invention provides for unique and novel methods of efficiently determining whether a primitive is backfacing. One embodiment of the present invention is illustrated in FIGS. 2A and 2B, and will be discussed in conjunction with exemplary primitives illustrated in FIGS. 3A to 3C. Another embodiment of the present invention is illustrated in FIGS. 4A and 4B, and will be discussed further in detail in conjunction with FIGS. 5A to 5D.

In furtherance of the embodiments of the present invention, a graphic primitive as defined within the present disclosure to be a collection of polygons, such as triangles and quadrilaterals, or a collection of lines or points, for efficient display by a graphics pipeline. One example of a graphic primitive is a triangle-strip 410 illustrated in FIG. 3A. Other meshes or strips of polygons, such as a quad-mesh or a triangle fan may also be used. Graphic primitives such as triangle-strips, triangle-fans, quadrilateral strips, quadrilateral meshes, etc., are well known in the art of computer generated graphics. Therefore, it would be apparent to a person of ordinary skill in the art, upon reading the present disclosure, that many other graphic primitives comprising a plurality of polygons, lines, or points may also be used.

III. Backface Primitives Culling Using Bounding Cone

In accordance with one embodiment of the present invention, the method of backfacing primitives culling includes a pre-processing stage and a rendering stage. In the pre-processing stage, normal directions of primitives in the 3-D model are first calculated and stored. Then, in the rendering stage, culling is performed based on a viewing position and the pre-calculated normal directions.

FIG. 2A is a flow chart illustrating the pre-processing stage according to one embodiment of the present invention. At step 210, one of a plurality of primitives of the 3-D model is selected. In the present embodiment, a primitive may include a plurality of simple polygons such as triangles or quadrilaterals, or a plurality of lines or points. For example, with reference to FIG. 3A, a primitive may comprise triangle-strip 410 including three juxtaposing triangles 410a, 410b and 410c. Also illustrated in FIG. 3A are a plurality of normal vectors 415a, 415b and 415c of triangles 410a, 410b and 410c, respectively. It should be noted that polygons of the primitive may not be co-planar. Consequently, as illustrated, normal vectors 415a, 415b and 415c are not parallel and are pointing in different directions. In another embodiment of the present invention, normal vectors are associated with the vertices of the polygons of each primitive. Representation of normal vectors by the vertices of a primitive is well known in the art of 3-D graphics. Therefore, it should be apparent to those ordinarily skilled in the art, upon reading the present disclosure, that other methods for representing the normal vectors are applicable as well.

With reference again to FIG. 2A, at step 220, a plurality of normal vectors of the selected primitive are determined. A normal vector may be defined as a vector that points perpendicularly in the direction a polygon is facing, or as the vectors at each vertex of the polygon. As discussed above, in the present embodiment, a primitive is defined as a collection of simple polygons such as triangles for efficient display by a graphics pipeline. In the present embodiment, directions of the normal vectors may either be defined explicitly or implicitly. For instance, in an explicit representation, a 3-D model may contain definitions, such as position and direction, of the normal vector(s) of each polygon. On the other hand, in an implicit representation, the normal vector of each polygon may be inferred from the plane of the polygon, and from the order in which vertices of the polygon are stored. Methods of determining a normal vector of a polygon are well known in the art, and are therefore not discussed herein in detail to avoid obscuring aspects of the present invention.

At step 230, a normal-bounding volume encompassing all the normal vectors is generated. In one embodiment of the present invention, a normal-bounding volume is a simple geometric shape, such as a cone or a pyramid, that encompasses all the normal vectors of the selected primitive. In the particular embodiment illustrated in FIG. 38, the normal-bounding volume comprises a cone 430. It should be noted that generation of the normal-bounding volume is independent of the position of the normal vectors relative to the primitive. Rather, as is well known in the art, vectors are defined only by a magnitude and a direction. Therefore, in the particular embodiment as illustrated in FIG. 3B, normal vectors 415a, 415b and 415c of primitive 410 may be positioned at a common point 420. Cone-shaped normal-bounding volume 430 (or normal-bounding cone 430) is then generated from the normal vectors 415a, 415b and 415c. Methods for generating a bounding volume encompassing a plurality of pre-defined vectors are well known in the art, and, therefore, are not discussed here in detail to avoid obscuring aspects of the present invention.

With reference again to FIG. 2A, at step 240, parameters of the normal-bounding volume are determined. Particularly, in the embodiment illustrated in to FIG. 3B, normal-bounding cone 430 may be defined by common point 420, which may be an arbitrary point on the surface of the primitive 410, a center vector 435, and an apex angle 440. Common point 420 of the normal-bounding cone 430 may be arbitrarily pre-defined to be located at a center of the primitive 410, or at one of the vertices of polygons 410a, 410b or 410c. Significantly, center vector 435 together with apex angle 440 are stored in association with the primitive to be retrieved later during the rendering stage of the present embodiment.

With reference again to FIG. 2A, at step 250, it is determined whether all the primitives of the 3-D model have been processed. If some of the primitives of the 3-D model have not been processed, steps 210 through 250 are repeated. On the other hand, if all the primitives have been processed, the pre-processing stage ends, and the data have been prepared for the rendering stage.

FIG. 2B is a flow chart 300 illustrating the rendering stage according to one embodiment of the present invention. At step 310, one of the plurality of primitives from the graphics model is selected for rendering. According to one embodiment of the present invention, the primitives may be selected in any arbitrary order. In addition, other methods for increasing the rendering efficiency, such as occlusion culling, may be applied before the present method such that fewer primitives are processed for backface culling.

At step 320, a visible half-space corresponding to a viewing vector of the scene is determined. A viewing vector is defined within the present disclosure as a vector from a point of the primitive to the eye point or view point. A space-partitioning plane that is perpendicular to the viewing vector partitions the entire scene-space into two halves. In this embodiment, the half that contains the view vector is the visible half-space. A exemplary viewing vector 460 and an exemplary space-partitioning plane 450 are illustrated in FIG. 3C. As shown, viewing vector 460 is perpendicular to plane 450. Further, space-partitioning plane 450 partitions the entire scene-space into two halves: a visible half-space 452 and a back-facing half-space 454. In the particular embodiment as illustrated in FIG. 3C, the space-partitioning place 450 is flat. However, it should be apparent to those ordinarily skilled in the art, upon reading the present disclosure, that other half-space partitioning schemes can be used to divide the scene space into uneven halves as well.

Referring back to FIG. 2B, at step 330, it is determined whether the normal-bounding volume of the selected primitive intersects with the visible half-space as defined by the viewing vector at step 310. FIG. 3C is a graphical representation of step 330 of FIG. 2B. As illustrated, plane 450, as defined by viewing vector 460, separates the scene-space into visible half-space 452 and back-facing half-space 454. Further, as illustrated in FIG. 3C, normal-bounding cone 430 encroaches upon visible half-space 452. In one embodiment of the present invention, assuming A is the angle between the viewing vector and the normal-bounding cone 430's center vector 435, and B is half of the normal-bounding cone's apex angle 440, the test for intersection between the bounding cone and the half-space would be: if $\cos(A) >= -\sin(B)$ then the intersection is not empty, therefore the primitive is visible, and if $\cos(A) < -\sin(B)$ then the primitive is not visible. It would be apparent to those ordinarily skilled in the art, upon reading the present disclosure, that other methods for detecting intersection may also be used.

At step 340, if it is determined that the normal-bounding volume is excluded by the visible half-space, then none of the normal vectors of the selected primitive is within the visible half-space. Therefore, it can be safely concluded that none of the polygons of the primitive is visible. In other words, the primitive is back-facing.

At step 350, once it is determined that the selected primitive is back-facing, the primitive is rejected from further graphics processing in the current frame. In this way, computationally intensive processes, such as ray-tracing, rasterization, etc., would not be applied to the back-facing primitive. As a result, computational time and effort are significantly saved.

It should be noted that, at step 350, the selected primitive is not removed from the 3-D graphics model. Rather, the selected primitive is culled from rendering until the viewing vector 460 changes. When the viewing vector 460 changes, however, visibility computation according to the present embodiment has to be carried out again.

On the other hand, at step 360, if it is determined that the normal-bounding cone intersects with the visible half-space, then it cannot be concluded that the primitive is back-facing. Therefore, at step 370, in order to accurately render the model, the primitive is sent down the graphics pipeline to be rendered. Naturally, other culling processes, such as view frustum culling or occlusion culling, may remove the primitive from the graphics pipeline. However, assuming that the primitive is not culled by other processes, the primitive is rendered on the display. In this way, the present invention allows fast and efficient culling of back-facing primitives, and is particularly useful in interactive displays of 3-D models.

At step 380, it is determined whether all the primitives of the 3-D model have been processed. If some of the primitives have not been processed, steps 310 through 380 are repeated. On the other hand, if all the primitives have been processed, then the rendering stage ends, and the process returns.

IV. Backface Primitives Culling Using Normal Bit-Vectors and Visibility Bit-Vectors In another embodiment of the present invention, the method of culling backfacing primitives includes a pre-processing stage for determining and storing normal directions of the primitive, and a rendering stage in which primitives are culled according to a viewing position and the pre-calculated normal directions. Particularly, in this embodiment, visibility determination is facilitated by representing normal directions of each primitive with a normal bit-vector, and by representing visible normal directions with a visibility bit-mask.

In furtherance of the present embodiment, in order to perform culling efficiently, normal directions of each primitive are represented by a bitmask, or a normal bit-vector. FIG. 4A is a flow diagram 500 illustrating the steps for determining the normal bit-vector for a primitive. As illustrated, at step 510, normal directions are defined by a tessellation, T, of a unit sphere. Particularly, according to one embodiment, the tessellation, T, is calculated by approximating the sphere with an isocahedron (a 20-sided polyhedron with pentagonal facets) by subdividing the pentagonal facets into triangles. For higher levels of tessellation, each of the triangles may be further subdivided into finer triangles. It should also be noted that methods for spatially subdividing a unit sphere are well known in the art. Therefore, it should be apparent to those ordinarily skilled in the art that other tessellating methods may also be used.

Figure 5A:
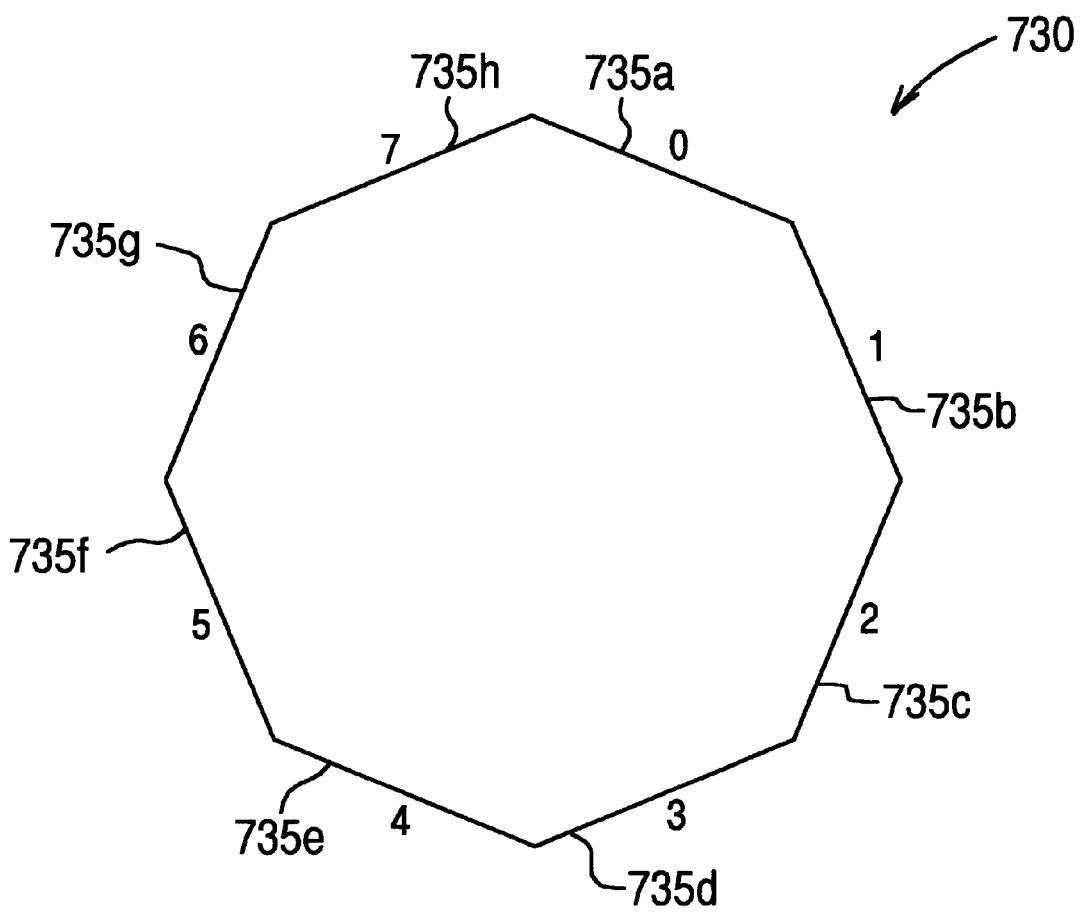
FIG. 5A illustrates an exemplary 2-D tessellation in furtherance of one embodiment of the present invention.

FIG. 5A illustrates an exemplary two dimensional (2-D) tessellation 730. As illustrated, tessellation 730 includes eight facets 735a–h, each identified by a number 0–7, and each corresponds to a different normal direction. For simplicity, a 2-D tessellation 730 is used to illustrate the principles of the present invention. However, it should be noted that the same principles described herein are applicable to 3-D tessellation as well.

Figure 5B:
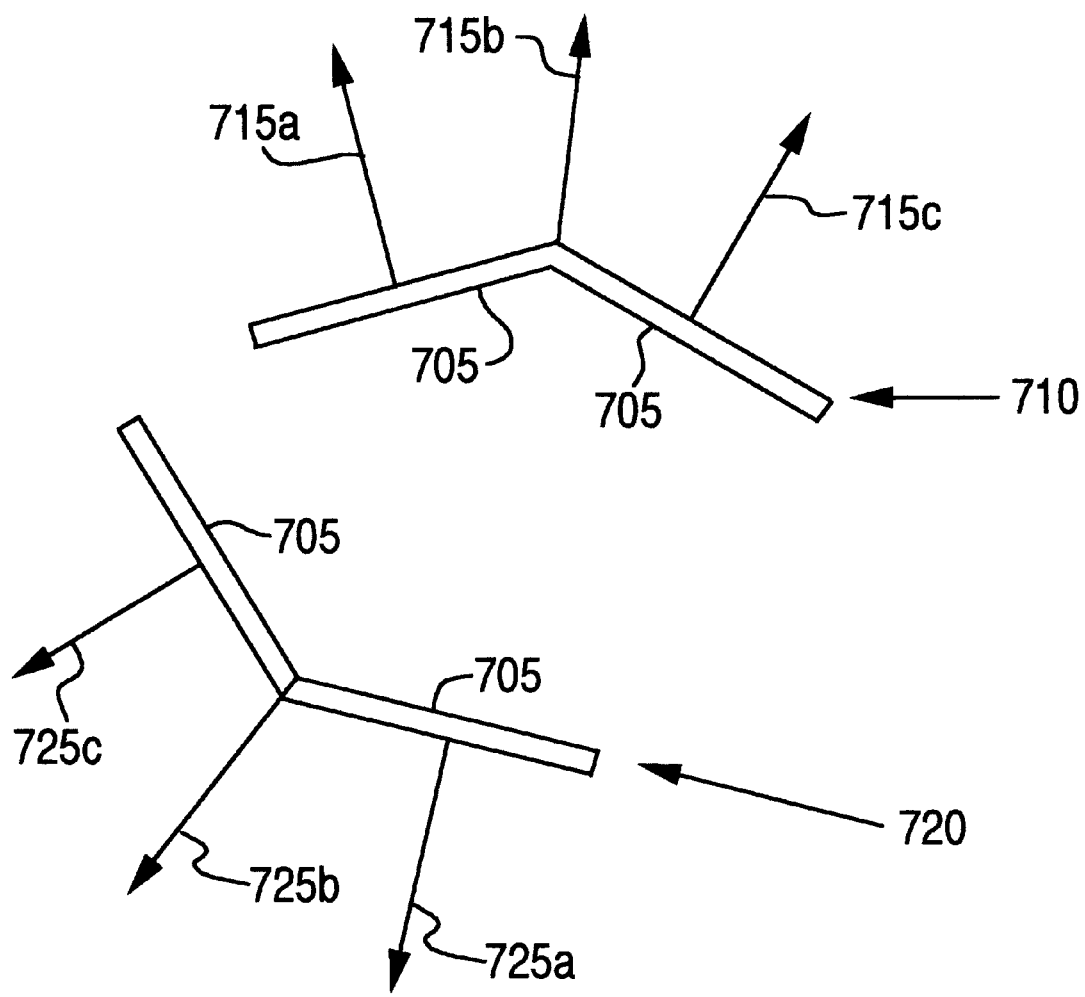
FIG. 5B illustrates two exemplary 2-D primitives on which one embodiment of the present invention may be applied. For simplicity, 2-D primitives are illustrated.

With reference again to FIG. 4A, at step 520, one of a plurality of primitives of the 3-D model is selected. As defined above, a primitive is a collection of simple polygons such as triangles or quadrilaterals, or a collection of lines or points, for efficient display in a graphics pipeline. Exemplary two-dimensional primitives 710 and 720 are illustrated in FIG. 5B. It should be noted that, for simplicity, the principles of the present invention are explained in conjunction with two-dimensional primitives of FIG. 5B. However, it should be apparent to those of ordinary skill in the art that the principles elaborated herein are equally applicable to 3-D primitives.

Referring to FIG. 4A again, at step 530, a plurality of normal vectors of the selected primitive are determined. As discussed above, a normal vector is associated with a polygon and may be defined as a vector that points perpendicularly in the direction the polygon is facing or as the normals of the vertices of the polygon. For lines or points the user has to specify the primitive normals. Normal vectors 715a, 715b and 715c of primitive 710, and normal vectors 725a, 725b, and 7235c of primitive 720 are also illustrated in FIG. 5A.

Figure 5C:
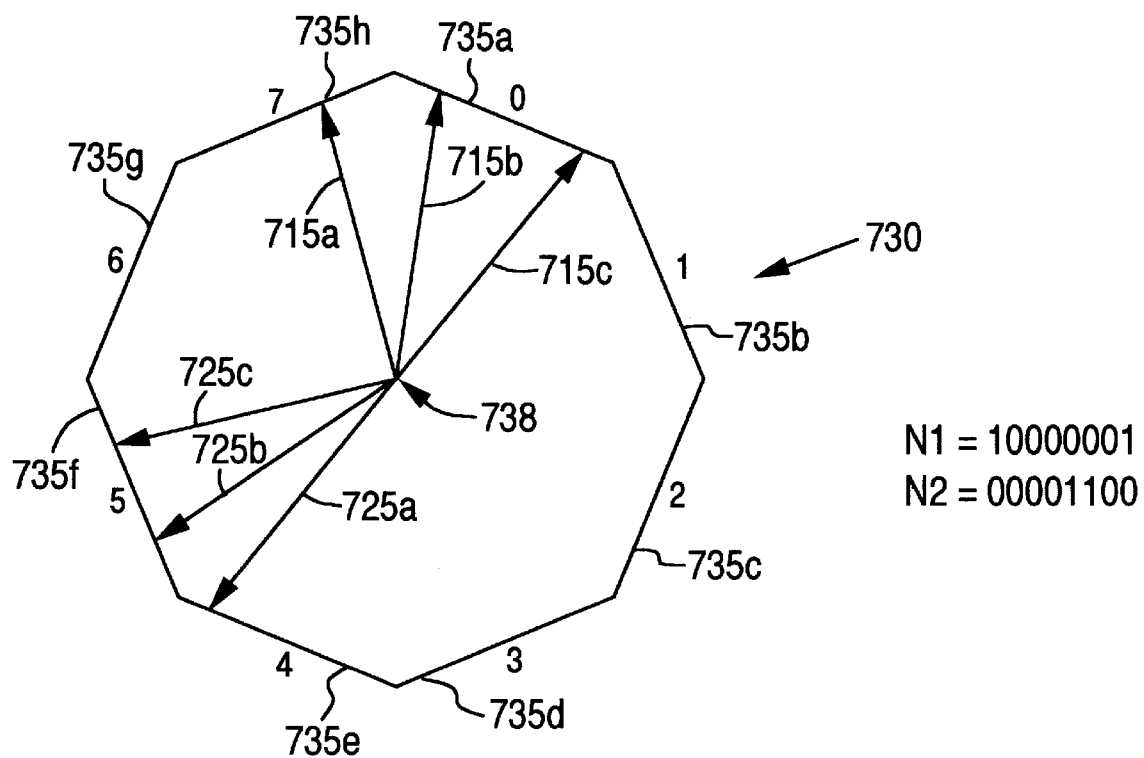
FIG. 5C illustrates the exemplary 2-D tessellation and normal vectors of the exemplary primitives of FIG. 5B according to one embodiment of the present invention. As illustrated, each normal vector is positioned at the center of the unit sphere and intersects one facet of the tessellation.

At step 540, the normal vectors determined in step 520 are aligned such that all the normal vectors are positioned at a center of the tessellation. FIG. 5C illustrates 2-D tessellation 730 and normal vectors 715a–c and 725a–c positioned at the center 738 of 2-D tessellation 730. For simplicity, it is assumed that normal vectors 715a–c and 725a–c lie on the same plane as 2-D tessellation 730. Each of the normal vectors 715a–c and 725a–c are pointing at one of the facets 735a–h. Particularly, normal vector 715a points at facet 735h, and normal vector 715b–c point at facet 735a. In addition, normal vector 725a points at facet 735e, normal vectors 725b–c point at facet 735f.

At step 550, a normal bit-vector, N, is created for the selected primitive. According to the present embodiment, normal bit-vector, N, comprises a sequence of bits, each bit corresponding to one facet of the tessellated sphere defined in step 510. For example, for a 400-facets tessellation, the corresponding normal-bit vectors would comprise a sequence of 400 bits. As another example, for the 8-facets 2-D tessellation 730 of FIGS. 5A and 5C, the normal bit-vectors would each comprise 8 bits. Further according to the embodiment as illustrated in FIGS. 5A and 5C, facets 735a–h are labeled 0 to 7, respectively, corresponding to bit 0 to bit 7 of the normal bit-vector.

The normal bit-vector, N, is used for representing the directions of the normal-vectors of the selected primitive. To this end, bit i of the normal bit-vector is set to 1 if at least one normal vector of the primitive belongs to facet i of the tessellation. For example, with reference to 2-D tessellation 730 of FIG. 5C, the normal bit-vector, N1, of the primitive 720 would be 1000001 because normal vector 715a is directed at facet 735h corresponding to bit-7 of the normal bit-vector, and because normal vectors 715b and 715c are directed facet 735a corresponding to bit-0 of the normal bit-vector. As another example, normal bit-vector, N2, of the primitive 730 would be 00001100 because normal vector 725a is directed at facet 735e corresponding to bit-4 of the normal bit-vector, and normal vectors 725b and 725c are directed at facet 735f corresponding to bit-5 of the normal bit-vector.

With reference again to FIG. 4A, at step 560, it is determined whether all primitives of the 3-D model have been processed. In the present embodiment, if some of the primitives of the 3-D model have not been processed, steps 510 through 560 are repeated. On the other hand, if all the primitives have been processed, the pre-processing stage ends, and primitives of the 3-D model are ready to be rendered.

FIG. 4B is a flow diagram 600 illustrating the rendering stage of one embodiment of the present method of culling backfacing primitives. At step 610, one of a plurality of primitives of the 3-D model is selected for culling. As described above, each primitive is associated with a normal bit-vector determined at step 550 of FIG. 4A. Naturally, the normal bit-vector of the selected primitive is also retrieved.

At step 620, a visibility bit-vector which describes the visibility of the facets of the tessellation is generated. Visibility of the facets of the tessellation is defined by a viewing vector which describes the position of a view point with respect to the 3-D model, and a pre-defined view angle. Methods for determining the visibility of the facets of the tessellation are well known in the art, and are therefore not described herein to avoid obscuring aspects of the present invention.

Figure 5D:
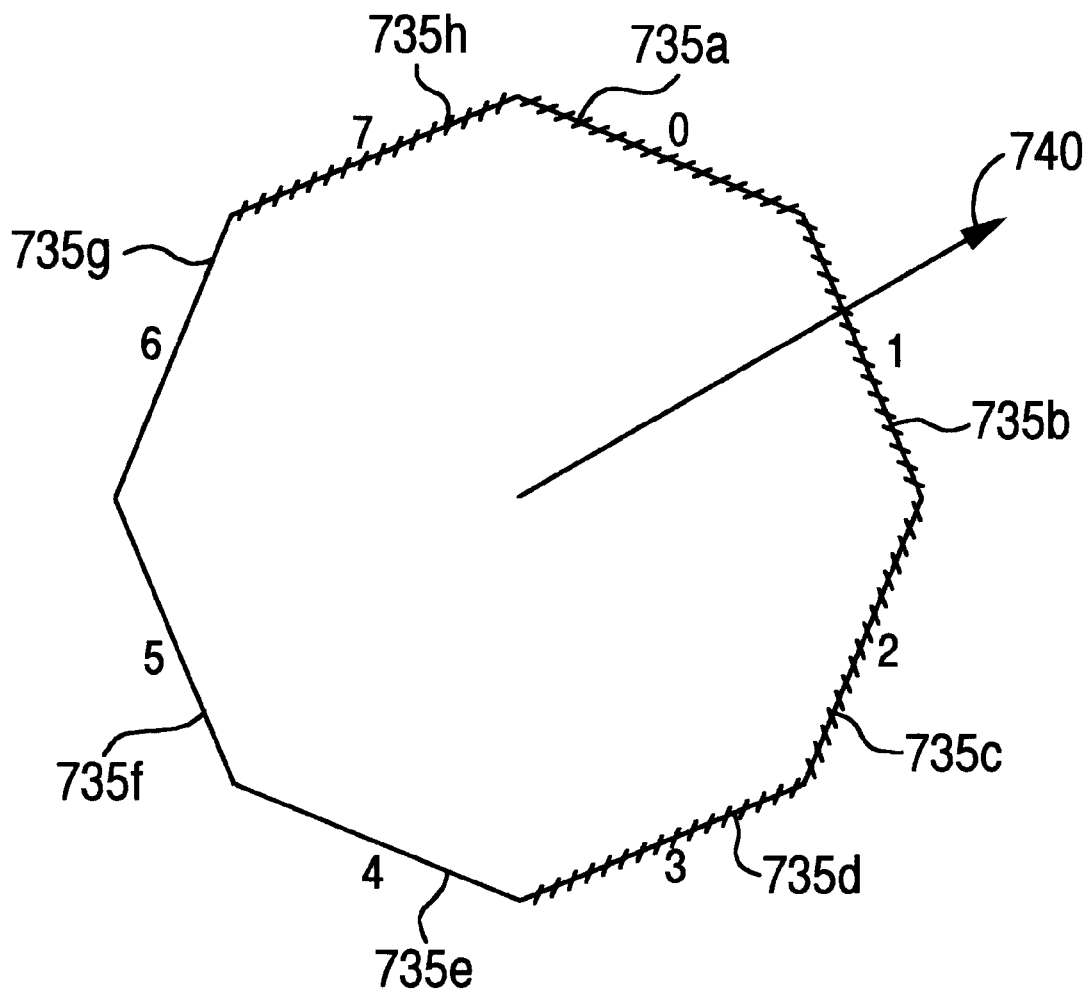
FIG. 5D illustrates the exemplary 2-D tessellation of FIG. 5B and a viewing vector according to one embodiment of the present invention.

According to the present embodiment, the visibility bit-vector comprises a sequence of bits wherein each bit corresponds to a facet of the tessellation defined at step 510 of FIG. 4A. Further, the bits of the visibility bit-vector are set according to the visibility of the facets. For example, FIG. 5D illustrates an exemplary viewing vector 740 positioned at center 738 of 2-D tessellation 730. In the particular embodiment as shown, facets 735a–d and 735h are determined to be visible according to the direction of the viewing vector 740. Accordingly, visibility bit-vector, V, for viewing vector 740 is 11110001, because facets 735a–d and 730h are represented by bits 0, 1, 2, 3, and 7, respectively, of the visibility bit-vector.

With reference to FIG. 4B again, at step 630, a bitwise binary logical "AND" operation is performed on the normal bit-vector, N, of the selected primitive, and the visibility bit-vector V. For example, as described above, the normal bit-vector, N1, for primitive 710 is 10000001, and the visibility bit-vector for viewing vector 740 is 11110001 Thus, the result of the bitwise "AND" operation is 10000001. As another example, if primitive 720 is selected, then the normal bit-vector, N2, which is 00001100, is bitwise "AND" ed with visibility bit-vector, V which is 11110001. In this case, however, the result of the bitwise "AND" operation becomes 00000000.

At step 640, if it is determined that the result of the logic "AND" operation equals 0 (e.g. all bits of the resulting bit vector are "0"), then the selected primitive is back-facing. Therefore, at step 650, the selected primitive is rejected from further graphics processing until the viewing vector or the view point changes.

At step 660, if it is determined that the result of the bitwise "AND" operation does not equal to 0 (e.g. some bits of the resulting bit vector are "1"), then the selected primitive is probably visible. Accordingly, at step 670, the selected primitive is sent down the graphics pipeline for further processing.

At step 680, it is determined whether all the primitives of the 3-D model have been processed. If some of the primitives have not been processed, steps 610 through 680 are repeated. On the other hand, if all the primitives have been processed, then the rendering stage ends, and the process returns.

The method of backface primitives culling has thus been described. By using the method of the present invention, backfacing primitives may be culled, thus effectively minimizing the processing power wasted on hidden polygons. Consequently, complex scenes with millions of polygons may be rendered on machines with limited processing power.

What is claimed is:

1. In a computer system having a graphics pipeline for displaying three-dimensional (3D) graphics on a display, a computer implemented method of rendering a primitive, said method comprising the computer implemented steps of:

a) determining a plurality of normal vectors of said primitive;

b) in association with said primitive, determining a normal bounding volume encompassing said plurality of normal vectors, wherein each one of said plurality of normal-bounding volumes is defined by a minimal geometrical shape necessary for encompassing a plurality of normal vectors associated with a respective one of said plurality of primitives, one of said plurality of primitives comprises a plurality of lines each corresponding to at least one of said plurality of normal vectors;

c) defining a visible half-space according to a pre-determined viewing vector wherein said viewing vector is defined as a vector from a point of the primitive to a view point, wherein said half-space is defined by a space partitioning plane orthogonal to said viewing vector; and d) provided that said normal-bounding volume does not intersect said visible half-space, removing said primitive from said graphics pipeline.

2. The computer implemented method according to claim 1 wherein said normal-bounding volume is a minimal simple geometrical shape necessary for encompassing all of said plurality of normal vectors.

3. The computer implemented method according to claim 2 wherein said normal-bounding volume comprises a bounding cone.

4. The computer implemented method according to claim 3 further comprising the step of:
    in association with said primitive, storing a center vector and an apex angle of said bounding cone.

5. The computer implemented method according to claim 1 wherein said primitive comprises a tri-strip.

6. The computer implemented method according to claim 1 wherein said primitive comprises a tri-fan.

7. The computer implemented method according to claim 1 wherein said primitive comprises a plurality of polygons each corresponding to at least one of said plurality of normal vectors.

8. The computer implemented method according to claim 1 wherein said primitive comprises a plurality of lines each corresponding to at least one of said plurality of normal vectors.

9. The computer implemented method according to claim 1 wherein said primitive comprises a plurality of points each corresponding to at least one of said plurality of normal vectors.

10. In a computer system having a graphics pipeline for displaying three-dimensional (3D) graphics on a display, a computer implemented method of efficiently rendering a 3D model, said 3D model including a plurality of primitives, said method comprising the computer implemented steps of:
    a) processing said 3D model to determine a plurality of normal-bounding volumes for said plurality of primitives, wherein each one of said plurality of normal-bounding volumes is defined by a minimal geometrical shape necessary for encompassing a plurality of normal vectors associated with a respective one of said plurality of primitives, one of said plurality of primitives comprises a plurality of lines each corresponding to at least one of said plurality of normal vectors;
    b) defining a visible half-space according to a predetermined viewing vector wherein said viewing vector is defined as a vector from a point of the primitive to a view point, wherein said half-space is defined by a space partitioning plane orthogonal to said viewing vector; and
    c) provided that one of said plurality of normal-bounding volumes does not intersect said visible half-space, selectively removing a corresponding one of said plurality of primitives from said graphics pipeline such that backfacing primitives are removed from further graphics processing.

11. The computer implemented method according to claim 10 wherein each one of said plurality of normal-bounding volumes is defined by a minimal geometrical shape necessary for encompassing a plurality of normal vectors associated with a respective one of said plurality of primitives.

12. The computer implemented method according to claim 11 wherein said plurality of normal-bounding volumes comprise a plurality of bounding cones.

13. The computer implemented method according to claim 12 further comprising the step of:
    in association with each primitive, storing a center vector and an apex angle of a respective one of said plurality of bounding cones.

14. The computer implemented method according to claim 10 wherein said plurality of primitives comprise a tri-strip.

15. The computer implemented method according to claim 10 wherein said plurality of primitives comprise a tri-fan.

16. The computer implemented method according to claim 10 wherein said primitive comprises a plurality of polygons each corresponding to at least one of said plurality of normal vectors.

17. The computer implemented method according to claim 10 wherein said primitive comprises a plurality of lines each corresponding to at least one of said plurality of normal vectors.

18. The computer implemented method according to claim 10 wherein said primitive comprises a plurality of points each corresponding to at least one of said plurality of normal vectors.

19. In a computer system having a graphics pipeline for displaying three-dimensional (3-D) graphics on a display, a computer implemented method of rendering a primitive, said primitive having a plurality of normal vectors, said method comprising the computer implemented steps of:
    a) in association with said primitive, defining a normal bit-vector, wherein said normal bit-vector includes a first plurality of bits each representing one of a plurality of normal directions;
    b) defining a visibility bit-vector according to a viewing vector, wherein said visibility bit-vector includes a second plurality of bits each representing one of said plurality of normal directions;
    c) determining whether said normal bit-vector and said visibility bit-vector are bit-wise mutually exclusive; and
    d) provided said normal bit-vector and said visibility bit-vector are bit-wise mutually exclusive, removing said primitive from said graphics pipeline such that backfacing primitives are removed from further graphics processing.

20. The computer implemented method according to claim 19 further comprising the computer implemented steps of:
    tessellating a sphere into a plurality of facets, wherein each of said plurality of facets represents one of said plurality of normal directions.

21. The computer implemented method according to claim 20 wherein said step (a) further comprises the computer implemented steps of:
    setting one of said first plurality of bits to 1 provided that one of said plurality of normal vectors belongs to a respective one of said plurality of facets.

22. The computer implemented method according to claim 20 wherein said step (b) further comprises the computer implemented steps of:
    setting one of said second plurality of bits to 1 provided that a corresponding one of said plurality of facets is visible.

23. The computer implemented method according to claim 19 wherein primitive comprises a tri-strip.

24. The computer implemented method according to claim 19 wherein said primitive comprises a tri-fan.

25. The computer implemented method according to claim 19 wherein said primitive comprises a plurality of polygons, and wherein each one of said plurality of polygons corresponds to at least one bit of said normal bit-vector.

26. The computer implemented method according to claim 19 wherein said primitive comprises a plurality of lines each corresponding to at least one bit of said normal bit-vector.

27. The computer implemented method according to claim 19 wherein said primitive comprises a plurality of points each corresponding to at least one bit of said normal bit-vector.

28. A computer-usable medium having computer-readable program code embodied therein for causing a computer to perform a method of rendering a primitive, said primitive having a plurality of normal vectors, said method comprising the steps of:
   a) determining a normal-bounding volume associated with said primitive, wherein said normal-bounding volume encompasses all of said plurality of normal vectors, wherein each one of said plurality of normal-bounding volumes is defined by a minimal geometrical shape necessary for encompassing a plurality of normal vectors associated with a respective one of said plurality of primitives, one of said plurality of primitives comprises a plurality of lines each corresponding to at least one of said plurality of normal vectors;
   b) defining a visible half-space according to a predetermined viewing vector wherein said viewing vector is defined as a vector from a point of the primitive to a view point, wherein said half-space is defined by a space partitioning plane orthogonal to said viewing vector; and
   c) provided that said normal-bounding volume does not intersect said visible half-space, removing said primitive from said further graphics processing.

29. The computer-usable medium according to claim 28 wherein said normal-bounding volume is a minimal simple geometrical shape necessary for encompassing all of said plurality of normal vectors.

30. The computer-usable medium according to claim 28 wherein said normal-bounding volume comprises a bounding cone.

31. The computer-usable medium according to claim 30 wherein the method further comprises the step of:
   in association with said primitive, storing a center vector and an apex angle of said bounding cone.

32. The computer-usable medium according to claim 28 wherein said primitive comprises a tri-strip.

33. The computer-usable medium according to claim 28 wherein said primitive comprises a tri-fan.

34. The computer-usable medium according to claim 28 wherein said primitive comprises a plurality of polygons each corresponding to at least one of said plurality of normal vectors.

35. The computer implemented method according to claim 28 wherein said primitive comprises a plurality of lines each corresponding to at least one of said plurality of normal vectors.

36. The computer implemented method according to claim 28 wherein said primitive comprises a plurality of points each corresponding to at least one of said plurality of normal vectors.

37. A computer-usable medium having computer-readable program code embodied therein for causing a computer to perform a method of rendering a primitive, said primitive having a plurality of normal vectors, said method comprising the steps of:
   a) in association with each primitive, defining a normal bit-vector, wherein said normal bit-vector includes a first plurality of bits each representing one of a plurality of normal directions;
   b) defining a visibility bit-vector according to a viewing vector, wherein said visibility bit-vector includes a second plurality of bits each representing one of said plurality of normal directions;
   c) determining whether said normal bit-vector and said visibility bit-vector are bit-wise mutually exclusive; and
   d) provided said normal bit-vector and said visibility bit-vector are bit-wise mutually exclusive, removing said primitive from said graphics pipeline such that backfacing primitives are removed from further graphics processing.

38. The computer-usable medium according to claim 37 wherein the method further comprises the step of:
   tessellating a sphere into a plurality of facets, wherein each of said plurality of facets represents one of said plurality of normal directions.

39. The computer-usable medium according to claim 38 wherein said step (a) further comprises the step of:
   setting one of said first plurality of bits to 1 provided that one of said plurality of normal vectors belongs to a corresponding one of said plurality of facets.

40. The computer-usable medium according to claim 38 wherein said step (b) further comprises the step of:
   setting one of said second plurality of bits to 1 provided that a respective one of said plurality of facets is visible.

41. The computer-usable medium according to claim 37 wherein said primitive comprises a tri-strip.

42. The computer-usable medium according to claim 37 wherein said primitive comprises a tri-fan.

43. The computer-usable medium according to claim 37 wherein said primitive comprises a plurality of polygons each corresponding to at least one bit of said normal bit-vector.

44. The computer implemented method according to claim 37 wherein said primitive comprises a plurality of lines each corresponding to at least one bit of said normal bit-vector.

45. The computer implemented method according to claim 37 wherein said primitive comprises a plurality of points each corresponding to at least one bit of said normal bit-vector.

46. A computer-usable medium having computer-readable program code embodied therein for causing a computer to perform a method of rendering a patch of polygons, said polygons having a plurality of normal vectors, said method comprising the steps of:
   a) determining a normal-bounding cone associated with said patch, wherein said normal-bounding cone encompasses all of said plurality of normal vectors and wherein said normal-bounding cone comprises a cone axis and an apex angle $2\beta$;
   b) defining a visible half-space according to a predetermined viewing vector, wherein said visible half-space is defined by a space partitioning plane orthogonal to said viewing vector;
   c) determining an angle a between said viewing vector and said cone axis;
   d) comparing $\cos(\alpha)$ and $-\sin(\beta)$;
   e) provided that $\cos(\alpha) < -\sin(\beta)$, removing said primitive from further graphics processing.

47. The computer-usable medium according to claim 46 wherein said patch comprises a tri-strip.

48. The computer-usable medium according to claim 46 wherein said patch comprises a tri-fan.

* * * * *

UNITED STATES PATENT AND TRADEMARK OFFICE
CERTIFICATE OF CORRECTION

PATENT NO. : 6,359,629 B1  Page 1 of 1
DATED : March 19, 2002
INVENTOR(S) : Michael J. Hopcroft and Antonia Spyridi It is certified that error appears in the above-identified patent and that said Letters Patent is hereby corrected as shown below:

Column 6,
Line 24, please delete "38" and insert -- therefor -- 3B --.

Column 7,
Line 8, please delete "8" and insert therefor -- An --.

Column 8,
Line 63, please delete "7235$c$" and insert therefor -- 735$c$ --.
Line 64, please delete "5A" and insert -- therefor -- 5B --.

Column 9,
Line 31, after "directed", insert -- at --.

Column 14,
Line 53, please delete "a" and insert -- therefor -- $\alpha$ --.

Signed and Sealed this

Twenty-third Day of July, 2002

Attest:

Attesting Officer

JAMES E. ROGAN
Director of the United States Patent and Trademark Office